G. E. MILLER.
COMBINED THREADING AND REAMING TOOL FOR PIPE COUPLINGS.
APPLICATION FILED DEC. 17, 1913.

1,098,583.

Patented June 2, 1914.
2 SHEETS—SHEET 1.

Witnesses:
R. F. Dilworth
Elva Staniels

Inventor
George E. Miller
By F. N. Barber
Attorney

G. E. MILLER.
COMBINED THREADING AND REAMING TOOL FOR PIPE COUPLINGS.
APPLICATION FILED DEC. 17, 1913.
1,098,583.
Patented June 2, 1914.
2 SHEETS—SHEET 2.
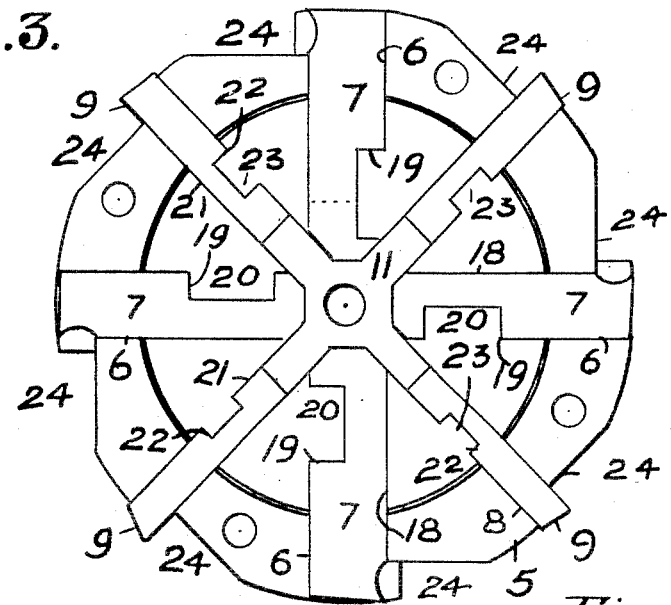
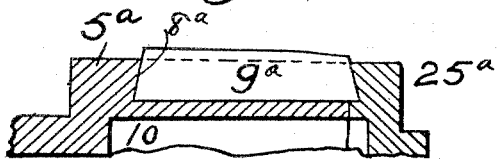
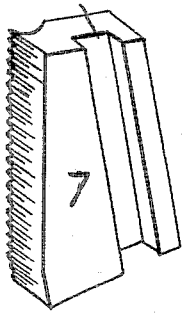
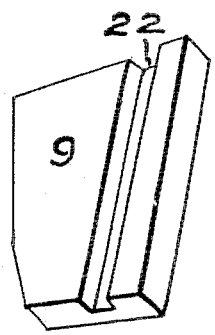
Witnesses:
Inventor
George E. Miller
By F. N. Barker
Attorney

UNITED STATES PATENT OFFICE.

GEORGE E. MILLER, OF ETNA, PENNSYLVANIA.

COMBINED THREADING AND REAMING TOOL FOR PIPE-COUPLINGS.

1,098,583.  Specification of Letters Patent.  Patented June 2, 1914.

Application filed December 17, 1913. Serial No. 807,237.

*To all whom it may concern:*

Be it known that I, GEORGE E. MILLER, a citizen of the United States, residing at Etna, in the county of Allegheny and State of Pennsylvania, have invented new and useful Improvements in Combined Threading and Reaming Tools for Pipe-Couplings, of which the following is a specification.

My invention relates to a combination tool for threading and reaming pipe-couplings.

Heretofore, it has been the practice to tap the ends of pipe-couplings without previously reaming or cutting away the surface to be threaded. By this practice the threading dies, which taper slightly toward their forward or leading ends, are required to cut away the metal for a considerable depth in excess of the depth of the threads. This excess is greatest at the end of the coupling and decreases toward the center. It requires a great deal more power to make the threading dies enlarge or taper the opening through a pipe-coupling than it would require to cut away the surplus or excess metal with a plain cutter or reamer. I prefer to cut away the metal in the pipe-couplings so that the threading dies will have to cut into the coupling wall only the depth of the threads. To accomplish this, I prefer to preliminarily cut or ream the ends of the couplings so that the interior wall from each end toward the center will taper to correspond with the taper of the threading dies.

I propose to accomplish the results herein stated by improvements in the tool shown in Letters Patent, No. 1,035,221, granted to me August 13, 1912, by providing the said tool with a set of cutters or reamers located between the threading dies and caused to be operated in the same manner as the said dies, the dies and the cutters moving simultaneously in opposite directions, so that, when one is retracted, the other will be projected so as to operate on the interior wall of a coupling. The cutters may be nonadjustable, if desired.

Figure 1:
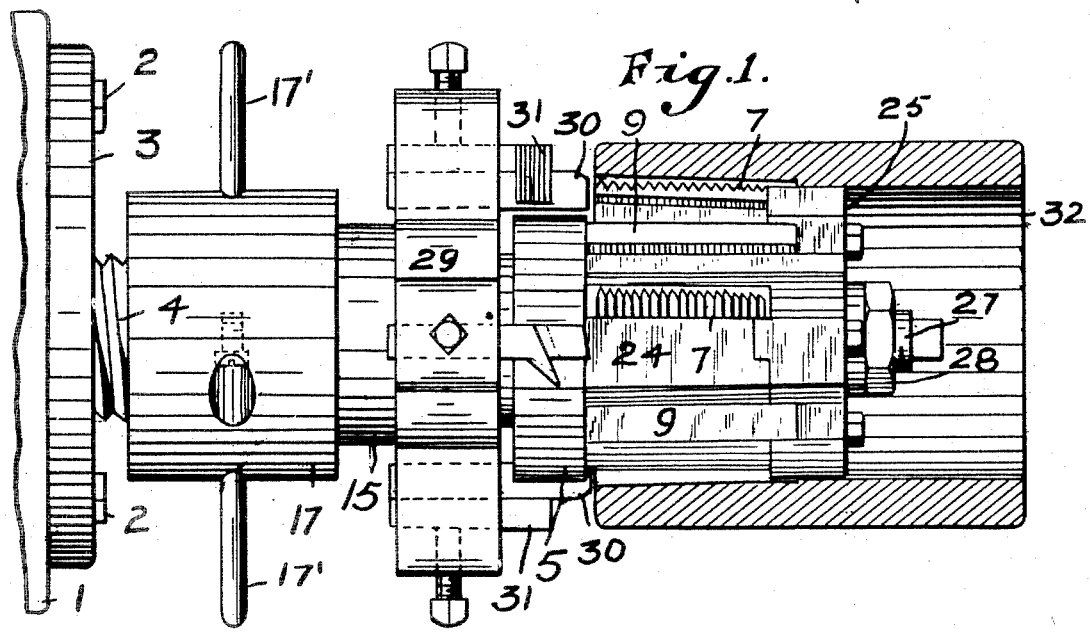
Figure 2:
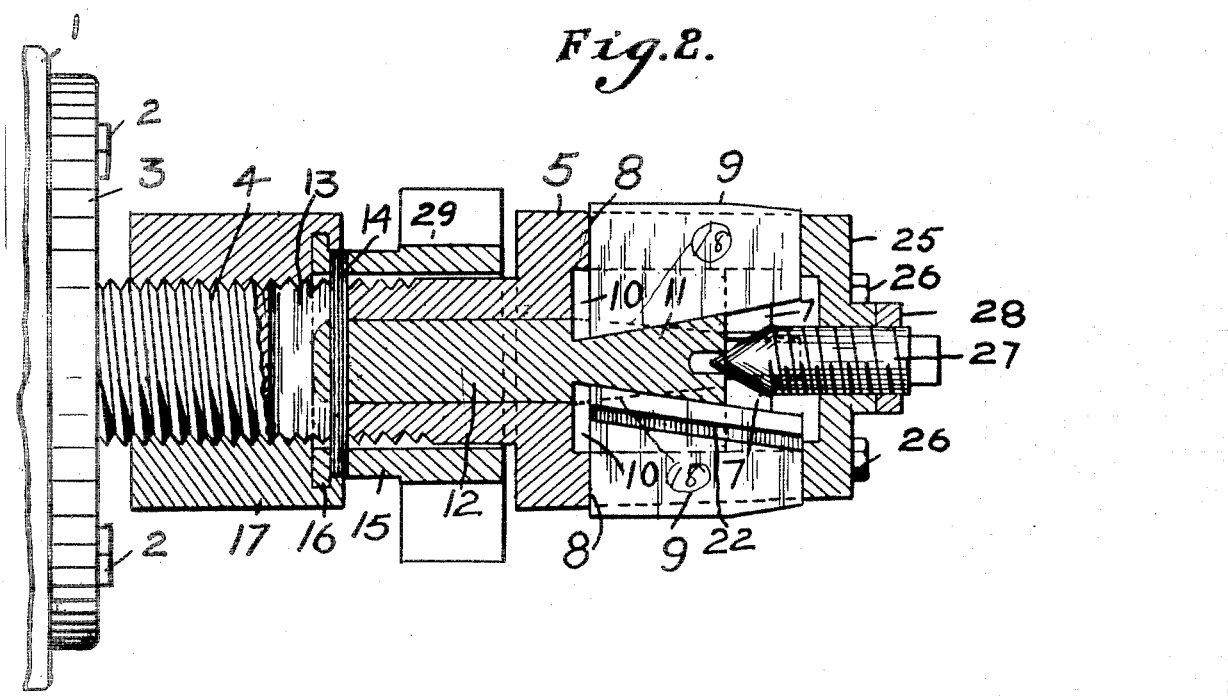

Referring to the accompanying drawings, Figure 1 is a side elevation of my invention in connection with a pipe-coupling shown in longitudinal section; Fig. 2, a central longitudinal section of Fig. 1, the coupling being omitted; Fig. 3, an end view with the cap 25 removed; Fig. 4, a side view of the expander with its stem broken off; Fig. 5, a perspective view of one of the threading dies; and Fig. 6, a perspective view of one of the reamers or cutters 9. Fig. 7 is a sectional detail showing a nonadjustable reaming cutter.

Referring to the drawings, 1 represents a lathe, or other rotary head, to which the tool or attachment constituting my invention is secured by the bolts 2, the head and the tool being in axial alinement. The tool has the plate or base 3 resting against the end of the said lathe head 1 and provided with the forwardly extending threaded stem 4, terminating in the frusto-conical head 5, which is somewhat larger in diameter than the stem and has a forward taper preferably parallel with the taper of the threads in the dies or of the interior of the couplings when finished.

The head 5 has a series of longitudinal slots 6 to receive the radially movable threading dies 7, and also a series of longitudinal slots 8 alternating with the slots 6 to receive the radially movable cutters or reamers 9. The dies 7 and the cutters 9 extend into the central cylindrical recess 10 in the head 5, which recess receives the cylindrical expander head 11 provided with the stem 12 of smaller diameter, extending into the threaded stem 4. The stem 4 is longitudinally slotted as shown at 13, to receive the cross-pin 14 in an opening in the stem 12 and the sleeve 15. The sleeve has at its inner end the exterior annular flange 16 seated in a corresponding recess in the nut 17 which works on the threads on the stem 4.

The portion of the expander head in the opening 10 is provided with a series of longitudinal radial recesses to receive the inner edges of the dies 7 and cutters 9. The recesses 18 for the dies 7 are inclined toward the outer end of the head and toward the axis thereof, the inner edges of the dies resting on the bases of the recesses 18. One side of each die 7 is provided with a groove 19 parallel with the base of the recess to receive a correspondingly inclined rib 20 on the side wall of the recess.

The recesses 21 for the cutters 9 are inclined in the opposite direction from that in which the grooves 18 are inclined; that is, they are inclined toward the axis of the head 11 from the outer end thereof toward the stem 12. One side of each cutter is provided with a groove 22 parallel with the base of the recess 21 to receive the correspondingly inclined rib 23 on the side wall of the recess 21.

The head 5 is provided with the clearances or grooves 24 at the leading edge or corner of each die 7 and cutter 9. The outer end of the head has the cap or cover 25 which is secured thereon by the bolts 26 and which closes the outer ends of the slots 6 and 8 in which the dies and cutter lie. By removing the cap, the dies and cutters can be removed from the heads 5 and 11. The cap contains the set screw 27 having its inner end tapered to limit the outward movement of the head 11 and therefore, the outward throw of the dies.

28 is a lock-nut on the screw 27 to prevent it from accidentally becoming loose.

The sleeve 15 is provided with the annular flange 29 which carries the reamers 30 and 31 for recessing and smoothing the ends of the couplings. These reamers are shown in my said patent, the cutter 30 being slightly beveled.

It will be seen that when the nut 17 is turned by the handles 17' away from the observer, the head 11 will be forced inwardly or toward the left, thereby causing the dies 7 to move inwardly and the cutters 9 to move outwardly. If the nut 17 be then turned in the opposite direction, the dies will be forced outwardly and the cutters inwardly. On Figs. 1 and 2 the cutters are in their outermost position and have completed the reaming or surfacing of one end of the coupling 32, preparatory to its being threaded. After the cutters 9 have surfaced or reamed one end of the coupling, the tool is backed out of the coupling and then advanced with the cutters retracted and the threading dies projecting. As the cutters have given the surface to be threaded the proper taper the dies have merely to cut their depth in the said surface, which is accomplished with but little power and by only a few turns of the tool.

In order to make the recessing cutters 30 leave a beveled shoulder in the coupling to guide a pipe to the threads therein, I prefer to bevel or taper the outer corner of these cutters 30 as shown on Fig. 1. To make sure that the cutters 9 will cut longitudinally into the coupling as far as the dies 7 will go, I prefer to make the cutters 9 extend longitudinally beyond the outer ends of the dies 9, as shown on Fig. 1.

On Fig. 7 I show the head $5^a$ containing the non-adjustable reamer or cutter $9^a$. The head is like the head 5 except that the slot $8^a$ for the cutter does not go through to the opening 10. The cutter $9^a$ does not have a groove 22, but is held in place by having its outwardly tapering ends engaged by similarly tapered end walls in the head $5^a$ and the cap $25^a$.

I claim—

1. In a combined threading and reaming tool, a rotary head having longitudinal slots, a set of threading dies and a set of reaming cutters arranged in the said slots and having radial movement therein, and means for simultaneously moving the sets of dies and cutters in opposite radial directions.

2. In a combined threading and reaming tool, a rotary head having longitudinal slots, a set of threading dies and a set of reaming cutters arranged in the said slots and having radial movement therein, an expander head having longitudinal slots to receive the inner edges of the dies and cutters, the slots having oppositely sloping inclines for causing the dies and cutters to move simultaneously in opposite radial directions.

Signed at Pittsburgh, Pa., this 11th day of December, A. D. 1913.

GEORGE E. MILLER.

Witnesses:
ALICE E. DUFF,
ELVA STANIEK.